United States Patent Office 3,546,472
Patented Dec. 8, 1970

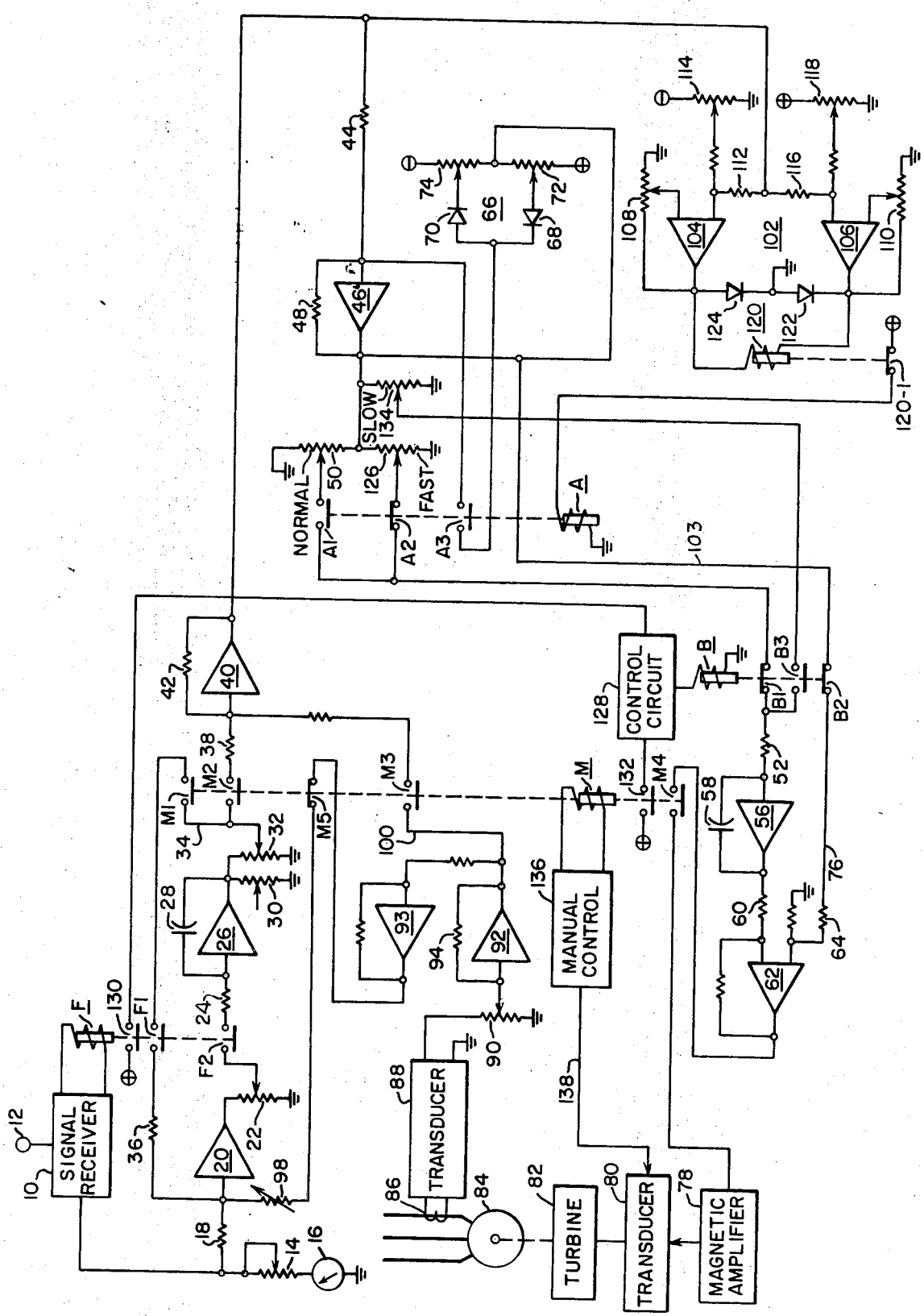

3,546,472
CONTROL FOR HYDROELECTRIC GENERATORS INCLUDING VARIABLE RESPONSE RATE
Arthur G. Hoffmann, Pittsburgh, Pa., assignor to Westinghouse Electric Corporation, Pittsburgh, Pa., a corporation of Pennsylvania
Filed Nov. 29, 1966, Ser. No. 597,667
Int. Cl. H02p 9/04
U.S. Cl. 290—40                                      7 Claims

ABSTRACT OF THE DISCLOSURE

A power control system for a hydroelectric generator that variably responds as a function of changes in a variable frequency assigned power signal and is operative to change the power output of the generator gradually when changing between manual and automatic modes of control operation and rapidly for fast automatic operation.

---

This invention relates to a system for controlling the power output of an electrical generator, and more particularly to a control for a hydroelectric generator.

As is known, power control systems for electrical generators employ a variable frequency assigned power signal capable of being transmitted over relatively long distances. This variable frequency signal is converted into a DC signal at the location of a particular generator in the power system, the magnitude of the DC signal being proportional to the frequency of the assigned power signal. The steady-state signal is normally integrated to more or less gradually change the power setting of the generator in response to step changes in assigned power; and in the case of steam turbine generators, this arrangement is entirely satisfactory due to the fact that the power output of the generator cannot be changed abruptly.

A hydroelectric generator, unlike steam generators, is capable of changing its output power from zero to a maximum within a relatively short period, which is primarily a function of hydraulic limitations (maximum allowable penstock surges). In certain cases, it is desirable to change the power setting of such hydroelectric generators abruptly; however conventional control systems employing integrators are incapable of effecting a very rapid change in assigned power.

All controls for generators must incorporate manual as well as automatic systems. Furthermore, provision must be made for disabling the automatic system when there is a complete failure of the input assigned power signal as might occur, for example, when there is a fault in the power control system. When switching from manual control or channel failure back to automatic control, it is desirable to do so with minimum system disturbance. However, if the manual setting, for example, should differ greatly from that dictated by the assigned power input signal, the normal automatic control system might cause an undesirable abrupt change in generator output and resultant system disturbance. Accordingly, when switching from manual or channel failture back to automatic operation, it is necessary to have some means whereby the transition can occur slowly—more slowly than it would under normal automatic control.

It can be seen, therefore, that it is desirable to have three distinct conditions or modes of hydroelectric generator operation. These are:

(A) Normal automatic operation—relatively slow response of the integrating control circuitry.

(B) Fast automatic operation—rapid response characteristics to accommodate a rapid change in assigned power during emergency conditions.

(C) Slow operation during switching from channel failure or manual control to automatic control—very slow response characteristics to avoid system disturbance due to a wide variation in, for example, the manual power setting and power setting dictated by the assigned power signal from the supervisory control system.

As an overall object, the present invention seeks to provide a control system for a hydroelectric generator which is capable of operating in any one of the three modes enumerated above.

Another object of the invention is to provide a control system for a hydroelectric generator which enables the power output of the generator to be changed gradually or abruptly, depending upon conditions.

A further object of the invention is to provide a control for a hydroelectric generator which allows for transfer from manual operation to automatic operation or vice versa with a minimum of system disturbance.

Still another object of the invention is to provide an automatic control for a hydroelectric generator which senses a fast rate of change of the assigned input power signal and switches out of the control system the normal slow rate integrating circuitry such that the output power from the generator can be adjusted rapidly.

The above and other objects and features of the invention will become apparent from the following detailed description taken in connection with the accompanying single figure drawing which schematically illustrates one embodiment of the invention.

With reference now to the drawing, the system includes four main relays F, M, A and B. Relay F, comprising a channel failure relay, is energized during normal automatic operation of the system, meaning that all of the normally open "F" contacts shown in the drawing are closed during normal operation. Similarly, the M relay is energized during automatic operation of the system and becomes deenergized only when the system is manually controlled. Therefore, during automatic operation, all of the normally open "M" relay contacts are closed. The A relay is energized through normally closed contacts 120–1 of a relay 120 which is energized only when the input power signal changes abruptly; and the B relay is energized only when switching from manual control or channel failure to automatic control and it is desired to have slow response to the input assigned power signal.

As shown, the system includes a signal receiver 10 having an input terminal 12 adapted to receive a variable frequency input signal, the frequency of which indicates the assigned power for the hydroelectric generator to be controlled. For example, the input signal on terminal 12 may vary between 15 and 35 cycles per second. The receiver 10 produces an output signal which, for example, may vary between 0 and 3.5 volts. This signal also is applied to a meter 16 which gives a visual indication of the magnitude of the assigned power.

The signal at the output of receiver 10 is applied to resistor 18 of a high gain allocator error amplifier 20. The output of amplifier 20 is then applied through potentiometer 22 and contact F–2 which is closed during normal operation, to input resistor 24 of an integrator circuit 26. As shown, the integrator 26 consists of an operational amplifier provided with a feedback path having a capacitor 28 therein. The integrator 26 is designed such that it has a relatively fast integration constant and, for example, may integrate from zero to maximum voltage in approximately one second.

The output of integrator 26 is applied across two potentiometer 30 and 32. The potentiometers 30 and 32 are identical, each being used to control a separate hydroelectric generator. For purposes of the present application, however, the circuitry for controlling only that generator associated with potentiometer 32 will be described, it being understood that the circuitry associated with potentiometer 30 is identical. The voltage taken from the movable tap of potentiometer 32 is applied through a negative feedback path 34 and resistor 36 to the input of high gain allocator error amplifier 20. Feedback path 34 includes contacts F–1 and M–1 of relays F and M which are both closed during normal operation of the system as was explained above.

When the assigned power input signal changes from, for example, 1 volt to 2 volts at the input to amplifier 20, the output of the integrator 26 will rise along a characteristic integration slope until the output appearing on the tap of potentiometer 32 equals 2 volts. At this time, the signal applied through the negative feedback path 34 will cancel that from signal receiver 10 at the input to amplifier 20, and the integration process will stop with the voltage on the tap of potentiomenter 32 remaining at 2 volts. A similar process, of course, occurs when the voltage at the input to amplifier 20 decreases with the output from integrator 26 following the input until the two are equal.

The output of integrator 26 on the tap of potentiometer 32 is applied through contacts M–2, which are closed during normal operation, and resistor 38 to the input of operational error amplifier 40 having a feedback path including resistor 42. The output of amplifier 40 is applied through resistor 44 to the input of a proportional amplifier 46, also having a feedback network incorporating resistor 48.

When the system is operating under normal conditions and the input signal does not change abruptly, relay A shown in the drawing will be energized and relay B will be deenergized in a manner hereinafter described. Consequently, contacts A–1 and A–3 will be closed while contacts A–2 will be open. Since relay B is deenergized, contacts B–1 and B–2 will be closed while contacts B–3 are open.

Under the normal operating conditions just described, and assuming that the input signal does not change abruptly, the output of amplifier 46 will be applied through potentiometer 50, contacts A–1, contacts B–1, and resistor 52 to a slow integrator 56 having a capacitor 58 in its feedback path. While the integrator 26 is capable of integrating the input signal from a minimum to a maximum in approximately one second, the integrator 56 integrates from a minimum to a maximum in five seconds. Thus, the signal is initially rapidly integrated in integrator 26 and subsequently slowly integrated in integrator 56 assuming, again, that the input signal does not change abruptly.

The output of integrator 56 is then applied through resistor 60 to a summing amplifier 62 along with the signal appearing across resistor 64. This latter signal is derived from a proportional amplifier 46 which contains a clamping circuit 66 comprised of a pair of parallel current paths each containing a diode 68 or 70. As shown, the cathode of diode 68 is connected through contacts A–3 to the summing junction of proportional amplifier 46; while its anode is connected to the movable tap on a potentiometer 72. The polarity of diode 70 is, of course, reversed with its anode being connected to the summing junction of proportional amplifier 46 and its cathode connected to the movable tap on a second potentiometer 74. Potentiometers 72 and 74 are connected in series between sources of positive (+) and negative (−) potential; while the junction of the two is connected to the output of proportional amplifier 46 and through contacts B–2, which are closed during normal operation, and lead 76 to resistor 64.

With the arrangement shown, the maximum output voltage of amplifier 46 will be limited by the clamping circuit 66 to a value proportional to the voltages at the sliders of potentiometers 72 and 74. This arrangement provides proportional clamping action but is effective only during normal operation when both contacts A–3 and B–2 are closed.

The output of summing amplifier 62 is applied to a magnetic amplifier 78 through the normally open contacts M–4 of relay M, which contacts are closed except during manual operation. The magnetic amplifier 78, in turn, actuates an electromagnetic transducer 80 to adjust the gates of hydraulic turbine 82 whereby more or less power is delivered to generator 84, depending upon requirements.

The power output of generator 84 is sensed by watt transducer 88. The output of transducer 88, appearing across rhetostat 90, is applied to transducer amplifier 92 having a resistor 94 connected in its feedback path. This signal, porportional to the actual output power from generator 84, is applied through lead 100 and contacts M–3, which are closed during normal operation, to the input of amplifier 40. It will be appreciated, therefore, that the arrangement of transducer 88, amplifier 92 and the feedback path to amplifier 40 completes a servo loop wherein the power delivered by the turbine will be varied until the output from generator 84 reaches the assigned power signal at the output of receiver 10. A second feedback path of the output signal from amplifier 92 to the summing junction is provided through resistor 98 and contact M–5. Contact M–5 is open when the generator is on automatic control. This feedback path is thus only affective when the generator is on manual control. Hence, in a control system consisting of more than one generator, the power generated by the generator on manual control is subtracted from the station assigned power, thus, only the difference between assigned power and power produced by the manual generator is assigned to the generator or generators on automatic control. Amplifier 93 inverts the output signal of amplifier 92 for proper sign relationship.

If the magnitude of a step change of the signal at the output of amplifier 40 reaches a certain value, either positive or negative, the relay A will be de-energized. This is accomplished by means of circuit 102 which includes a pair of rate detector amplifiers 104 and 106. Amplifier 104 is provided with a hysteresis feedback loop including resistor 108 and, similarly, amplifier 106 is provided with a hysteresis feedback loop including resistor 110. The signal from amplifier 40 is applied to amplifier 104 through resistor 112; however the amplifier 104 will not be triggered into conduction until the signal applied via resistor 112 exceeds the bias determined by potentiometer 114 having one of its terminals connected to a source of negative voltage (−). Likewise the signal from amplifier 40 is applied to one of the inputs of amplifier 106 through resistor 116; however amplifier 106 will not be triggered into conduction until the signal applied via resistor 116 exceeds a positive bias supplied by potentiometer 118 having one of its terminals connected to a source of positive voltage (+). When the voltage applied via resistor 112 exceeds that established by potentiometer 114, amplifier 104 will fire and energize relay 120 through diode 122.

Similarly, when amplifier 106 fires in response to a signal of a certain magnitude, but of the opposite polarity, the relay 120 will be energized through diode 124. In either case, energization of relay 120 will open its contacts 120–1 to deenergize relay A which was previously energized.

When relay A becomes deenergized, contacts A–1 and A–3 open while contacts A–2 close, whereupon potentiometer 126, set for fast response characteristics, will come into play. The operation of the circuit under these conditions is the same as that described above for normal conditions, except that the clamping circuit 66 is now disconnected from the circuit and the output of amplifier 46 is now applied directly to summing amplifier 62 through leads 103 and 76. This means that the proportional step response is no longer limited and the transducer 80 responds much more quickly to a change in the assigned power input signal.

Up to this point, normal and fast rate response conditions have been described. However, as was explained above, there is a third condition which occurs when the system returns to normal after channel failure or manual control. Under these conditions, relay B is energized and remains energized for a period of time determined by control circuit 128. Thus, whenever relay F becomes energized after a fault is corrected, contacts 130 close. Similarly, when relay M becomes energized at the completion of manual control, contacts 132 close. In either case, relay B becomes energized and remains energized for a time delay period determined by control circuit 128.

When relay B is energized, contacts B-1 and B-2 open while contacts B-3 close. Under these circumstances, potentiometer 134 comes into play while potentiometers 50 and 126 are disconnected from the circuit. The operation in this case is again the same as described above for normal conditions except that the proportional action stability by-pass circuit through lead 76 is no longer effective and the response of the transducer 80 is much slower.

If the signal at the output of receiver 10 should fail for some reason or other, relay F will become deenergized, whereupon all of the "F" contacts shown in the drawing will open. Under these conditions, integrator 26 will maintain an input signal to the control circuit at the level at the time of failure, and the turbine 82 remains in its previously-established condition. Likewise, if it is desired to manually control the system, such control is effected through a manual control circuit 136. When this circuit is effective, the relay M becomes deenergized, whereupon all of the normally open "M" contacts in the circuit will open such that the automatic servo control loop is again no longer effective. Under these circumstances, signals from the manual control circuit 136 are applied through lead 138 directly to transducer 80.

It can be seen, therefore, that the present invention satisfies the three required conditions given above, namely normal response, fast response upon an abrupt change in assigned power, and slow response upon return to normal from channel failure or manual control.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a control system for a turbine-driven electrical generator wherein the power delivered by the turbine is determined by an assigned power signal, the combination of means responsive to the assigned power signal and the actual output of the generator for providing a control signal representing the difference between assigned power and actual power output of the generator, means for amplifying the control signal, first, second and third variable impedance devices, an integrator for the output of said amplifying means, first switch means for interconnecting the amplifying means with said integrator through said first variable impedance device under normal operating conditions when the control signal does not change abruptly, second switch means for interconnecting the amplifying means with said integrator through said second variable impedance device when the control signal does change abruptly, and third switch means for connecting the amplifying means to said integrator through said third variable impedance device upon return of the control system to automatic operation after manual control of the same and when the assigned power signal is restored after failure of the same.

2. The control system of claim 1 wherein the second variable impedance device effects a faster response rate of the turbine than said first variable impedance device, and wherein the third variable impedance device effects a slower response rate of the turbine than the first variable impedance device.

3. In a control system for a turbine-driven electrical generator wherein the power delivered by the turbine is determined by an assigned power signal, the combination of means responsive to said assigned power signal and the generator output for providing a control signal representing the difference between assigned power and actual power output of the generator, circuitry for integrating said control signal, first impedance means in the integrating circuitry for causing the integrating circuitry to control said turbine at a predetermined response rate under normal conditions when the assigned power signal does not change abruptly, means for sensing an abrupt change in said control signal, second impedance means in the integrating circuitry operative in response to said sensing means when an abrupt change in said control signal occurs for controlling said turbine at a faster response rate than said predetermined response rate effected by said first impedance means, means for manually controlling the turbine and means for disabling the control system upon failure of the assigned power signal, means for sensing return of said control system to automatic operation at the completion of manual control and when the assigned power signal is restored after failure of the same, and third impedance means in said integrating circuitry operative by said last-named sensing means upon return of said control system to automatic operation for controlling said turbine at a slower response rate than said predetermined response rate effected by said first impedance means.

4. The control system of claim 3 wherein the third impedance means is operative only for a predetermined time delay following return of the control system to automatic operation at the completion of manual control and after the assigned power signal is restored upon failure of the same.

5. The combination as in claim 3 wherein each of the first, second and third impedance means is variable.

6. The combination as in claim 4 wherein each of the first, second and third impedance means is variable.

7. In apparatus for controlling a turbine-driven electrical generator wherein power delivered by the turbine is selectively controllable either manually, or automatically in response to an assigned power signal, the combination of:

(A) means for manually controlling the turbine;
(B) means for disabling said apparatus upon failure of the assigned power signal;
(C) means responsive to said assigned power signal and the generator output for providing a control signal representing the difference between assigned power and actual power output of the generator; and
(D) a control signal for controlling said turbine in response to said control signal, said control system comprising:
  (a) circuitry for integrating said control signal,
  (b) first impedance means in said integrating circuitry for providing a predetermined response rate to said control system,
  (c) means for sensing return of said apparatus to automatic operation upon completion of manual control and when the assigned power signal is restored after failure of the same,
  (a) second impedance means in said integrating circuitry operative in response to said sensing means upon return of said apparatus to automatic operation to provide to said control system a response rate slower than said predetermined response rate,
  (e) means for sensing an abrupt change in said control signal, and
  (f) third impedance means operative in response to the latter sensing means when said control signal changes abruptly to provide to said control system a response rate faster than said predetermined response rate.

References Cited

UNITED STATES PATENTS

| | | | |
|---|---|---|---|
| 2,668,264 | 2/1954 | Williams | 318—20.435 |
| 2,762,385 | 9/1956 | Smerke | 318—20.390 |
| 2,830,244 | 4/1958 | Davis | 318—20.390 |
| 3,112,406 | 11/1963 | Avery | 290—40 |
| 3,219,832 | 11/1965 | Avery | 290—40 |
| 3,219,936 | 11/1965 | Eksten et al. | 290—20.395 |
| 3,238,376 | 3/1966 | Ernst et al. | 290—40XV |
| 3,274,443 | 9/1966 | Eggenberger | 290—40XV |
| 3,033,496 | 5/1962 | Brands | 318—489XV |
| 3,391,315 | 7/1968 | Schwartzenberg | 318—20.395XV |
| 3,391,317 | 7/1968 | Bell | 318—20.395 |

G. R. SIMMONS, Primary Examiner

U.S. Cl. X.R.

318—18; 290—52